(12) United States Patent
Lee et al.

(10) Patent No.: US 11,294,196 B2
(45) Date of Patent: Apr. 5, 2022

(54) CAMERA MODULE

(71) Applicant: SAMSUNG ELECTRO-MECHANICS CO., LTD., Suwon-si (KR)

(72) Inventors: Sang Jong Lee, Suwon-si (KR); Nam Ki Park, Suwon-si (KR); Young Bok Yoon, Suwon-si (KR); Seung Hee Hong, Suwon-si (KR); Hee Soo Yoon, Suwon-si (KR); Su Bong Jang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/069,910

(22) Filed: Oct. 14, 2020

(65) Prior Publication Data

US 2021/0173225 A1   Jun. 10, 2021

(30) Foreign Application Priority Data

Dec. 10, 2019   (KR) .................. 10-2019-0164194
Jun. 24, 2020   (KR) .................. 10-2020-0077026

(51) Int. Cl.
*G02B 27/64* (2006.01)
*G03B 5/02* (2021.01)

(52) U.S. Cl.
CPC .......... *G02B 27/646* (2013.01); *G02B 27/644* (2013.01)

(58) Field of Classification Search
CPC .......... G03B 5/00; G03B 5/02; G02B 27/644; G02B 27/646
See application file for complete search history.

(56) References Cited

U.S. PATENT DOCUMENTS 9,319,574 B2    4/2016   Shin et al.
2007/0127907 A1  6/2007   Iwasaki et al.
(Continued)

FOREIGN PATENT DOCUMENTS

CN   104238238 A   12/2014
CN   107966868 A    4/2018
(Continued)

OTHER PUBLICATIONS

Korean Office Action dated Jul. 12, 2021 in counterpart Korean Patent Application No. 10-2020-0077026 (7 pages in English, 6 pages in Korean).

(Continued)

*Primary Examiner* — Minh Q Phan
(74) *Attorney, Agent, or Firm* — NSIP Law

(57) ABSTRACT

A camera module includes a housing, a frame disposed in an interior space of the housing, a movable body, a lens holder, first and second optical image stabilization (OIS) actuators. The movable body is configured to move in a first direction, perpendicular to an optical axis. The lens holder is configured to move in a second direction perpendicular to the first direction. The first OIS actuator is configured to move the movable body in the first direction. The second OIS actuator is configured to move the lens holder in the second direction. The frame includes a first opening through which a first OIS coil and a first OIS magnet of the first OIS actuator are disposed to face each other, and a second opening through which a second OIS coil and a second OIS magnet of the second OIS actuator are disposed to face each other.

18 Claims, 3 Drawing Sheets

(56) References Cited

U.S. PATENT DOCUMENTS

| | | | |
|---|---|---|---|
| 2009/0252488 A1 | 10/2009 | Eromaki et al. | |
| 2012/0099201 A1 | 4/2012 | Chan et al. | |
| 2014/0362284 A1 | 12/2014 | Shin et al. | |
| 2015/0055220 A1 | 2/2015 | Lim et al. | |
| 2016/0170170 A1 | 6/2016 | Go et al. | |
| 2017/0371232 A1* | 12/2017 | Wu | G02B 27/646 |
| 2018/0115715 A1 | 4/2018 | Jung et al. | |
| 2018/0246341 A1 | 8/2018 | Jung et al. | |
| 2019/0196300 A1 | 6/2019 | Kim et al. | |
| 2019/0346740 A1 | 11/2019 | Suh et al. | |

FOREIGN PATENT DOCUMENTS

| | | |
|---|---|---|
| CN | 108508678 A | 9/2018 |
| CN | 209198746 U | 8/2019 |
| CN | 110475050 A | 11/2019 |
| JP | 6583613 B2 | 10/2019 |
| KR | 10-2014-0144126 A | 12/2014 |
| KR | 10-2015-0022637 A | 3/2015 |
| KR | 10-1555904 B1 | 9/2015 |
| KR | 10-2018-0099513 A | 9/2018 |
| KR | 10-2019-0061439 A | 6/2019 |

OTHER PUBLICATIONS

Chinese Office Action dated Nov. 29, 2021 in counterpart Chinese Patent Application No. 202011297726.8 (3 pages in English, 6 pages in Chinese).

* cited by examiner

A-A'

B-B'

C-C'

CAMERA MODULE

CROSS-REFERENCE TO RELATED APPLICATIONS

This application claims the benefit under 35 USC 119(a) of Korean Patent Application Nos. 10-2019-0164194 filed on Dec. 10, 2019, and 10-2020-0077026 filed on Jun. 24, 2020, in the Korean Intellectual Property Office, the entire disclosures of which are incorporated herein by reference for all purposes.

BACKGROUND

1. Field

The following description relates to a camera module.

2. Description of Related Art

In general, portable communication terminals such as mobile phones, PDAs, and portable PCs not only transmit text or voice data but can also capture images and transmit image data. In response to this trend, a camera module is basically installed in a portable communication terminal in order to be able to take pictures, transmit image data, or video chat.

An actuator may be provided in the camera module, and the actuator may be mainly classified as an actuator for autofocus (AF) and/or an actuator for an optical image stabilizer (OIS).

However, the structure of a typical actuator is disposed on three of the four sides of the camera module, of which the actuators disposed on two adjacent surfaces are used for OIS. In addition, typical actuators have a structure in which a coil is disposed in an outer case of a module, and a permanent magnet is disposed in an inner lens driving (cylinder) portion.

However, when multiple actuators are operated, inter-module interference may occur due to magnetic flux leakage caused by the OIS actuator, and interference may occur when components sensitive to a magnetic field are disposed around the actuator.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing having an interior space, a frame disposed in the interior space of the housing, a movable body, a lens holder, a first optical image stabilization (OIS) actuator, and a second OIS actuator. The movable body is movably disposed in the frame and configured to move in a first direction, perpendicular to an optical axis. The lens holder, disposed on an upper surface of the movable body, is configured to move in a second direction perpendicular to the first direction. The first OIS actuator, disposed on a lower surface of the movable body and a bottom surface of the housing, is configured to move the movable body in the first direction. The second OIS actuator, disposed on a lower surface of the lens holder and the bottom surface of the housing, is configured to move the lens holder in the second direction.

The frame includes a first opening through which a first OIS coil and a first OIS magnet of the first OIS actuator are disposed to face each other, and a second opening through which a second OIS coil and a second OIS magnet of the second OIS actuator are disposed to face each other. The movable body includes a third opening disposed below the second opening of the frame.

The first OIS actuator may include the first OIS coil disposed on one among the housing and the movable body, and the first OIS magnet disposed on the other among the housing and the movable body to oppose the first OIS coil.

The first OIS coil may be disposed on the bottom surface of the housing, and the first OIS magnet may be disposed on the movable body.

The first OIS actuator may further include a first OIS yoke disposed below the first OIS magnet.

The second OIS actuator may include the second OIS coil disposed on one among the housing or the lens holder, and the second OIS magnet disposed on the other among the housing or the lens holder to oppose the second OIS coil.

The second OIS coil may be disposed on the bottom surface of the housing, and the second OIS magnet may be disposed on the lower surface of the lens holder.

The second OIS actuator may further include a second OIS yoke disposed below the second OIS magnet.

The lens holder may include a protrusion on which the second OIS coil or the second OIS magnet is disposed.

The camera module may further include a first OIS ball member disposed between the frame and the movable body to facilitate movement of the movable body.

The camera module may further include a second OIS ball member disposed between the movable body and the lens holder to facilitate movement of the lens holder.

The camera module may further include an autofocus (AF) actuator installed on an inner surface of the housing and an external surface of the frame.

The AF actuator may include an AF coil disposed on the inner surface of the housing, and an AF magnet disposed on the external surface of the frame to oppose the AF coil.

The AF actuator may further include an AF yoke disposed outside of the AF coil.

The camera module may further include an AF ball member disposed between the inner surface of the housing on which the AF actuator is installed and the external surface of the frame.

The camera module may further include an auxiliary driving member configured to return the frame and the movable body installed on the frame to a previous position.

The auxiliary driving member may include an auxiliary yoke disposed on the frame, and an auxiliary magnet disposed on the lower surface of the movable body to oppose the auxiliary yoke.

Lengths of the first and second OIS coils, and the first and second OIS magnets may satisfy: b−a>travel distance of the first and second OIS actuators, where a is the length of the first and second OIS magnets and b is a length of an active region of the first and second OIS coils.

The housing may be comprised in an electronic device.

In another general aspect, an electronic device includes a camera module. The camera module includes a frame disposed in an interior space of a housing, a movable body, a lens holder, a first optical image stabilization (OIS) actuator, and a second OIS actuator. The movable body movably is disposed in the frame and configured to move in a first direction, perpendicular to an optical axis. The lens holder, disposed on an upper surface of the movable body, is configured to move in a second direction perpendicular to the first direction. The first optical image stabilization (OIS) actuator includes a first OIS coil and a first OIS magnet, and is configured to move the movable body in the first direction. The first OIS coil is disposed on one among a lower surface of the movable body and a bottom surface of the housing, and the first OIS magnet is disposed on the other one among the lower surface of the movable body and the bottom surface of the housing. A second OIS actuator includes a second OIS coil and a second OIS magnet, and is configured to move the lens holder in the second direction. The second OIS coil is disposed among a lower surface of the lens holder and the bottom surface of the housing, and the second OIS magnet is disposed on the other among the lower surface of the lens holder and the bottom surface of the housing.

The frame may include a first opening through which the first OIS coil and the first OIS magnet are disposed to face each other, and a second opening through which the second OIS coil and the second OIS magnet are disposed to face each other. The movable body may include a third opening disposed below the second opening of the frame.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
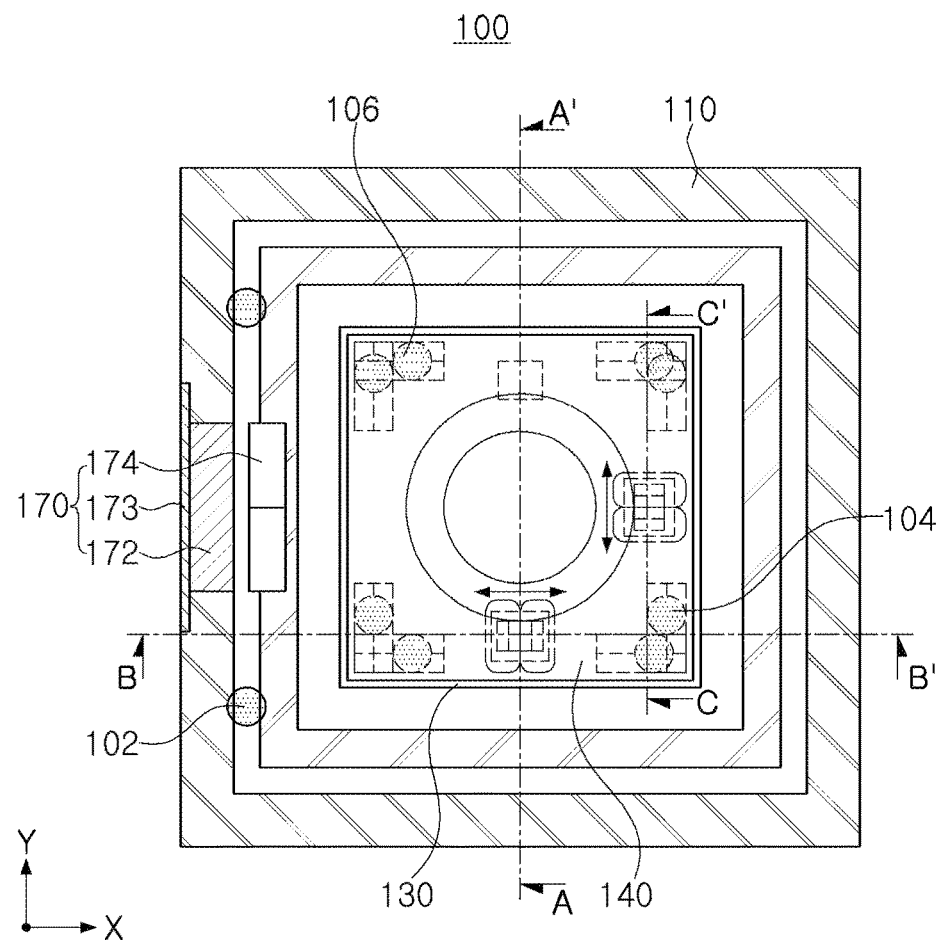
FIG. 1 is a schematic plan view illustrating a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Use herein of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various elements, these elements are not to be limited by these terms. Rather, these terms are only used to distinguish one element from another element. Thus, a first element referred to in the examples described herein may also be referred to as a second element without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Furthermore, although the examples described herein have a variety of configurations, other configurations are possible, as will be apparent after an understanding of the disclosure of this application.

Figure 2:
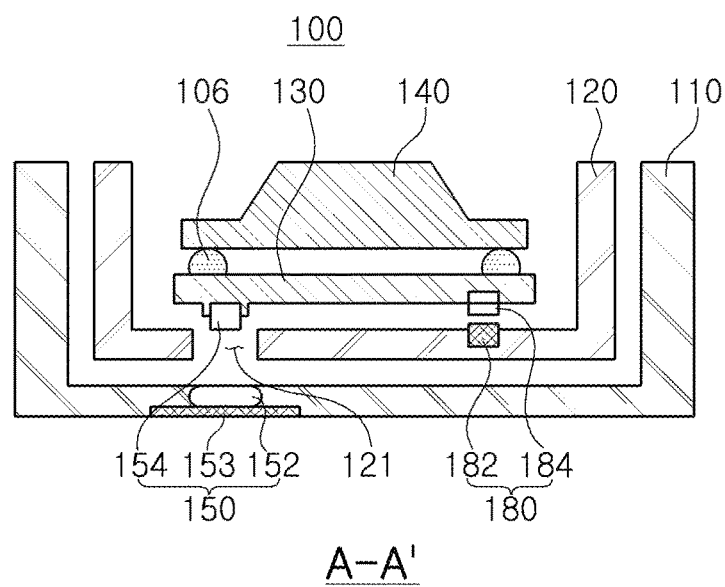
FIG. 2 is a configuration diagram illustrating an example of a first OIS actuator of the camera module of FIG. 1.
Figure 3:
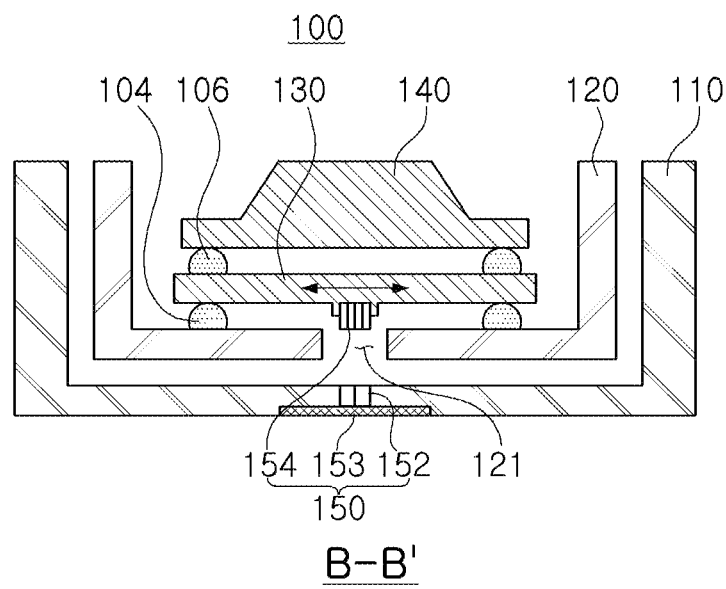
FIG. 3 is a configuration diagram illustrating an example of a second OIS actuator of the camera module of FIG. 1.
Figure 4:
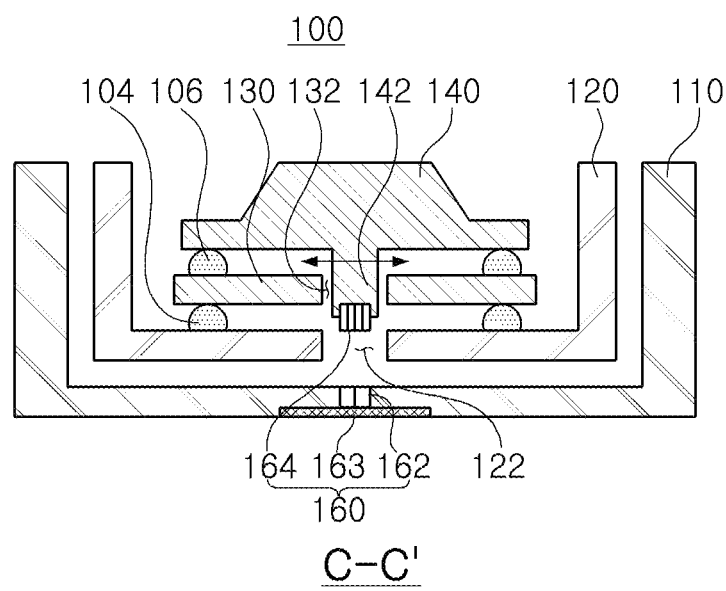
FIG. 4 is a configuration diagram illustrating an example of an auxiliary driving member of the camera module of FIG. 1.

FIG. 1 is a schematic plan view illustrating a camera module according to an example. FIG. 2 is a configuration diagram illustrating an example of a first actuator of the camera module of FIG. 1. FIG. 3 is a configuration diagram illustrating an example of a second actuator of the camera module of FIG. 1. FIG. 4 is a configuration diagram illustrating an example of an auxiliary driving member of the camera module of FIG. 1.

In FIGS. 1 to 4, a camera module 100, according to the first example, may be configured to include a housing 110, a frame 120, a movable body 130, a lens holder 140, a first OIS actuator 150, a second OIS actuator 160, an AF actuator 170, and an auxiliary driving member 180, as an example.

The housing 110 may have a box shape having an inner space, in which an upper surface is open. On the other hand, on one side of the inner surfaces of the housing 110, an AF coil 172 disposed in the AF actuator 170 configured to move the frame 120 up and down may be installed. The AF coil 172 may be disposed in front of an AF yoke 173 with respect to the center direction of the housing 110.

In addition, a first OIS coil 152 disposed in the first OIS actuator 150 and a second OIS coil 162 disposed in the second OIS actuator 160 may be installed on the bottom surface of the housing 110. The first OIS coil 152 may be disposed on a first OIS yoke 153. The second OIS coil 162 may be disposed on a second OIS yoke 163. Thus, the first OIS coil 152 and the second OIS coil 162, which require the supply of power, are installed in the housing 110 to simplify the structure of the camera module 100.

An AF ball member 102 configured for smooth movement of the frame 120 may be installed in a space between the housing 110 and the frame 120.

In this example, the case in which the housing 110 has a hexahedral shape with an open top is described as an example but is not limited thereto, and the shape of the housing 110 may be variously changed.

The frame 120 may be disposed in the inner space of the housing 110. The frame 120 may have a box shape with an open-top surface, such as the housing 110. In addition, an AF magnet 174 provided in the AF actuator 170 may be installed on one side of the outer surfaces of the frame 120. For example, an AF magnet 174 disposed to correspond to the AF coil 172 may be installed on the frame 120.

First and second openings 121 and 122 for driving of the first and second OIS actuators 150 and 160 may be provided in the bottom surface of the frame 120. A detailed description thereof will be described later.

An auxiliary yoke 182 provided in the auxiliary driving member 180 may be installed on the bottom surface of the frame 120.

The movable body 130 is movably installed in the inner space of the frame 120. To this end, a first OIS ball member 104 configured for movement of the movable body 130 may be installed in a space between the lower surface of the movable body 130 and the bottom surface of the frame 120. A first OIS magnet 154, disposed to correspond to the first OIS coil 152 of the first OIS actuator 150, may be installed on the lower surface of the movable body 130. The first OIS coil 152 and the first OIS magnet 154 may be disposed to face each other through the first opening 121 provided in the frame 120. In addition, the first opening 121 may have a shape corresponding to the shape of the first OIS coil 152 and the first OIS magnet 154, and a size corresponding to the size of the first OIS coil 152 and the first OIS magnet 154.

As an example, the movable body 130 may be moved in a first direction perpendicular to an optical axis, for example, in the X-axis direction of FIG. 1.

An auxiliary magnet 184 disposed to correspond to the auxiliary yoke 182 may be installed on the lower surface of the movable body 130. For example, when the driving of the first and second OIS actuators 150 and 160 is stopped, the auxiliary driving member 180 may return the movable body 130 to an original or previous position.

On the other hand, a third opening 132 for driving of the second actuator 160 may be provided on the bottom surface of the movable body 130. The third opening 132 may have a shape corresponding to the shape of the second OIS coil 162 and a second OIS magnet 164, and the size corresponding to that of the first OIS coil 162 and the first OIS magnet 164.

The lens holder 140 is movably coupled in the inner space of the frame 120 to be disposed on the upper portion of the movable body 130. To this end, a second OIS ball member 106 configured for movement of the lens holder 140 may be installed in a space between the upper surface of the movable body 130 and the lower surface of the lens holder 140. On the other hand, the second OIS magnet 164, disposed to correspond to the second OIS coil 162 of the second OIS actuator 160, may be installed on the lower surface of the lens holder 140. To this end, the lens holder 140 may be provided with a protrusion 142 for the installation of the second OIS magnet 164. For example, to reduce a separation distance between the second OIS magnet 164 and the second OIS coil 162, the lens holder 140 may be provided with the protrusion 142 on which the second OIS magnet 164 is installed. In addition, the second OIS coil 162 and the second OIS magnet 164 may be disposed to face each other through the second opening 122 provided in the frame 120 and the third opening 132 provided in the movable body 130. The second opening 122 may have a shape corresponding to the shape of the second OIS coil 162 and the second OIS magnet 164, and a size corresponding to that of the first OIS coil 162 and the first OIS magnet 164.

A plurality of lenses (not illustrated) may be installed in the lens holder 140.

The lens holder 140 may be moved in a Y-axis direction, which is a second direction perpendicular to the first direction, as illustrated in FIG. 1, for example.

Figure 5:
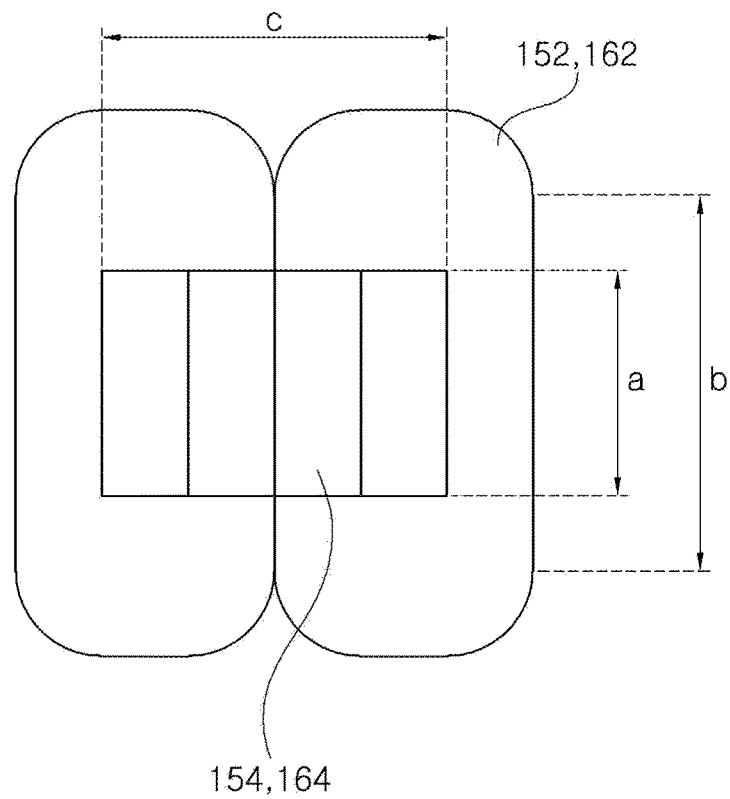
FIG. 5 is an explanatory diagram illustrating the size of the first and second OIS actuators of the camera module of FIG. 1.

As illustrated in FIG. 5, the lengths of the first and second OIS coils 152 and 612, and the first and second OIS magnets 154 and 164 may satisfy the following conditional expression.

Conditional Expression: b−a>Travel distance by first and second OIS actuators

In the conditional expression, a is the length of the first and second OIS magnets, and b is the length of the active region of the first and second OIS coils.

As described above, since the first and second OIS actuators 150 and 160 are disposed on the lower end portion of the camera module 100, leakage of the magnetic field to the side of the camera module 100 may be reduced. For example, the first and second OIS magnets 154 and 164 of the first and second OIS actuators 150 and 160 are disposed opposite to the first and second OIS coils 152 and 162 installed on the bottom surface of the housing 110. Accordingly, the magnetic field generated from the first and second OIS magnets 154 and 164 is formed in a downward direction. Therefore, leakage of the magnetic field to the side surface of the camera module 100 may be reduced.

In addition, the first OIS coil 152 and the first OIS magnet 154 of the first OIS actuator 150 are disposed to face each other through the first opening 121, and the second OIS coil 162 and the second OIS magnet 164 of the second OIS actuator 160 are disposed to face each other through the second and third openings 122 and 132. Therefore, the first and second OIS actuators 150 and 160 may be installed without increasing the size of the camera module 100.

In addition, since the first and second OIS coils 152 and 162 may be installed in the housing 110, assembly of the first and second OIS coils 152 and 162 may be facilitated.

Furthermore, since the first and second OIS ball members 104 and 106 for smooth movement of the frame 120, the movable body 130 and the lens holder 140 may be installed, smooth movement of the frame 120, the movable body 130 and the lens holder 140 may be implemented.

On the other hand, since the drawings are illustrated to describe the arrangement positions of the first and second OIS actuators 150 and 160 and the auxiliary driving member 180, the shapes of the housing 110, the frame 120, the movable body 130, and the lens holder 140 are not limited thereto.

Figure 6:
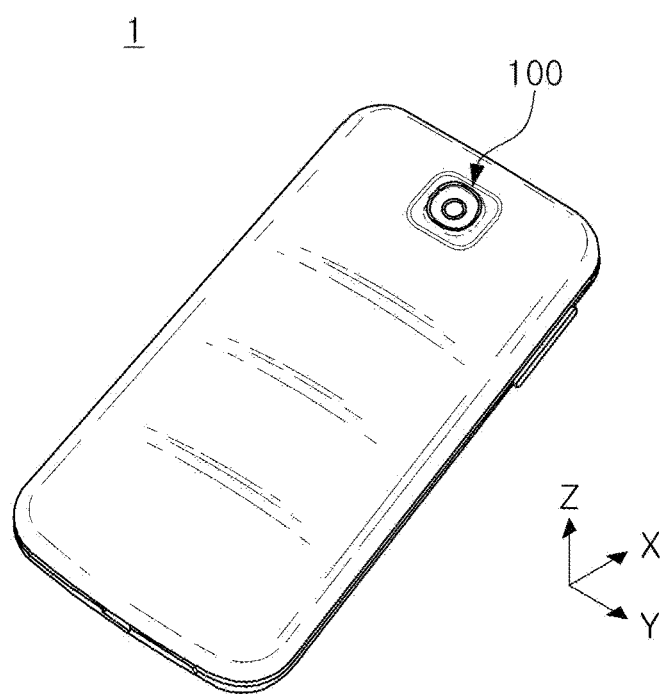
FIG. 6 is a perspective view of a portable electronic device according to an example.

FIG. 6 is a perspective view of a portable electronic device, according to an example. A portable electronic device 1 may be, for example, a mobile communications terminal, a smartphone, a tablet PC, or the like. The portable electronic device 1 may be equipped with the camera module 100 to capture a subject.

As set forth above, there is an effect of reducing the leakage of the magnetic field to the side of the camera module.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing having an interior space;
a frame disposed in the interior space of the housing;
a movable body movably disposed in the frame and configured to move in a first direction, perpendicular to an optical axis;
a lens holder, disposed on an upper surface of the movable body, configured to move in a second direction perpendicular to the first direction;
a first optical image stabilization (OIS) actuator, disposed on a lower surface of the movable body and a bottom surface of the housing, configured to move the movable body in the first direction, the first OIS actuator comprising a first OIS coil and a first OIS magnet; and
a second OIS actuator, disposed on a lower surface of the lens holder and the bottom surface of the housing, configured to move the lens holder in the second direction, the second OIS actuator comprising a second OIS coil and a second OIS magnet,
wherein the first OIS coil and the first OIS magnet are disposed to face each other through a first opening of the frame, the second OIS coil and the second OIS magnet are disposed to face each other through a second opening of the frame, and a third opening of the movable body is disposed above the second opening.

2. The camera module of claim 1, wherein the first OIS coil is disposed on one among the housing and the movable body, and the first OIS magnet is disposed on the other among the housing and the movable body to oppose the first OIS coil.

3. The camera module of claim 1, wherein the first OIS coil is disposed on the bottom surface of the housing, and the first OIS magnet is disposed on the movable body.

4. The camera module of claim 3, wherein the first OIS actuator further comprises a first OIS yoke disposed below the first OIS magnet.

5. The camera module of claim 1, wherein the second OIS coil is disposed on one among the housing and the lens holder, and the second OIS magnet is disposed on the other among the housing and the lens holder to oppose the second OIS coil.

6. The camera module of claim 5, wherein the second OIS coil is disposed on the bottom surface of the housing, and the second OIS magnet is disposed on the lower surface of the lens holder.

7. The camera module of claim 6, wherein the second OIS actuator further comprises a second OIS yoke disposed below the second OIS magnet.

8. The camera module of claim 5, wherein the lens holder comprises a protrusion on which the second OIS coil or the second OIS magnet is disposed.

9. The camera module of claim 1, further comprising a first OIS ball member disposed between the frame and the movable body to facilitate movement of the movable body.

10. The camera module of claim 1, further comprising a second OIS ball member disposed between the movable body and the lens holder to facilitate movement of the lens holder.

11. The camera module of claim 1, further comprising an autofocus (AF) actuator installed on an inner surface of the housing and an external surface of the frame.

12. The camera module of claim 11, wherein the AF actuator comprises an AF coil disposed on the inner surface of the housing, and an AF magnet disposed on the external surface of the frame to oppose the AF coil.

13. The camera module of claim 12, wherein the AF actuator further comprises an AF yoke disposed outside of the AF coil.

14. The camera module of claim 11, further comprising an AF ball member disposed between the inner surface of the housing on which the AF actuator is installed and the external surface of the frame.

15. The camera module of claim 1, further comprising an auxiliary driving member configured to return the frame and the movable body installed on the frame to a previous position.

16. The camera module of claim 15, wherein the auxiliary driving member comprises:
an auxiliary yoke disposed on the frame; and
an auxiliary magnet disposed on the lower surface of the movable body to oppose the auxiliary yoke.

17. The camera module of claim 1, wherein lengths of the first and second OIS coils, and the first and second OIS magnets satisfy:
b−a>travel distance of the first and second OIS actuators, where a is the length of the first and second OIS magnets and b is a length of an active region of the first and second OIS coils.

18. The camera module of claim 1, wherein the housing is comprised in an electronic device.

\* \* \* \* \*